United States Patent [19]

Weisburn

[11] Patent Number: 5,794,796
[45] Date of Patent: Aug. 18, 1998

[54] STORAGE RACK FOR RETAINING SOFTWARE DEVICES HAVING MULTIPLE CONFIGURATIONS

[75] Inventor: James T. Weisburn, Massillon, Ohio

[73] Assignee: Alpha Enterprises, Inc., North Canton, Ohio

[21] Appl. No.: 359,593

[22] Filed: Dec. 20, 1994

[51] Int. Cl.⁶ .................................................. A47G 29/00
[52] U.S. Cl. .................. 211/40; 211/41; 206/307.1; 206/564; 312/9.54; 312/348.3
[58] Field of Search ................ 211/40, 41; 312/9.53, 312/9.54, 9.55, 318.3, 351; 206/307, 307.1, 308.3, 564, 565

[56] References Cited

U.S. PATENT DOCUMENTS

| | | | |
|---|---|---|---|
| D. 28,839 | 6/1898 | Kirkwood . | |
| D. 161,815 | 2/1951 | Beeman | D34/13 |
| D. 252,423 | 7/1979 | Bokor | D3/35 |
| D. 252,424 | 7/1979 | Bokor | D3/35 |
| D. 257,797 | 1/1981 | Apprahamian | D3/35 |
| D. 273,441 | 4/1984 | Anderson | D3/35 |
| D. 322,885 | 1/1992 | Chedid | D3/35 |
| D. 332,187 | 1/1993 | Stravitz | D6/407 |
| 464,544 | 12/1891 | Wood | 211/40 |
| 3,856,137 | 12/1974 | Brindley | 206/564 |
| 4,629,067 | 12/1986 | Pavlik et al. | 206/425 |
| 4,712,679 | 12/1987 | Lowe | 211/40 |
| 4,756,581 | 7/1988 | Phillips | 312/348.3 |
| 4,781,292 | 11/1988 | Sacherman et al. | 206/309 |
| 4,782,949 | 11/1988 | Berkman | 312/9.54 |
| 4,850,477 | 7/1989 | Gelardi et al. | 206/45.19 |
| 4,960,205 | 10/1990 | Wang | 206/307.1 |
| 5,027,955 | 7/1991 | Shoemaker et al. | 211/40 |
| 5,086,932 | 2/1992 | Gelardi et al. | 211/40 |
| 5,215,198 | 6/1993 | Sutton | 211/40 |
| 5,335,795 | 8/1994 | Chizen | 211/41 |
| 5,346,078 | 9/1994 | Ernetoft | 211/40 |
| 5,558,235 | 9/1996 | Hunt | 211/40 |

*Primary Examiner*—Leslie A. Braun
*Assistant Examiner*—Anita M. King
*Attorney, Agent, or Firm*—Sand & Sebolt

[57] ABSTRACT

A storage rack for retaining software devices having a variety of configurations. A one-piece body is formed with a central platform having a pair of side support racks with aligned grooves for receiving an edge of a CD ROM package. A central support rack is positioned below the grooves and intermediate the side support racks such that CD ROM packages supported within the grooves of the side support racks are suspended over the central support rack. The central support rack is formed with a plurality of equally spaced dividers, with each divider having an elongated slot extending transversely along its length and on either side thereof. The elongated slots retain an edge of 3½ inch software diskettes and PCMCIA cards whereby the CD ROM packages supported in the side support racks, and the 3½ inch diskettes and PCMCIA cards, may be moved between a forward position and a rearward position such that a user may selectively or successively view the front surface of each software device supported in the storage rack.

13 Claims, 3 Drawing Sheets

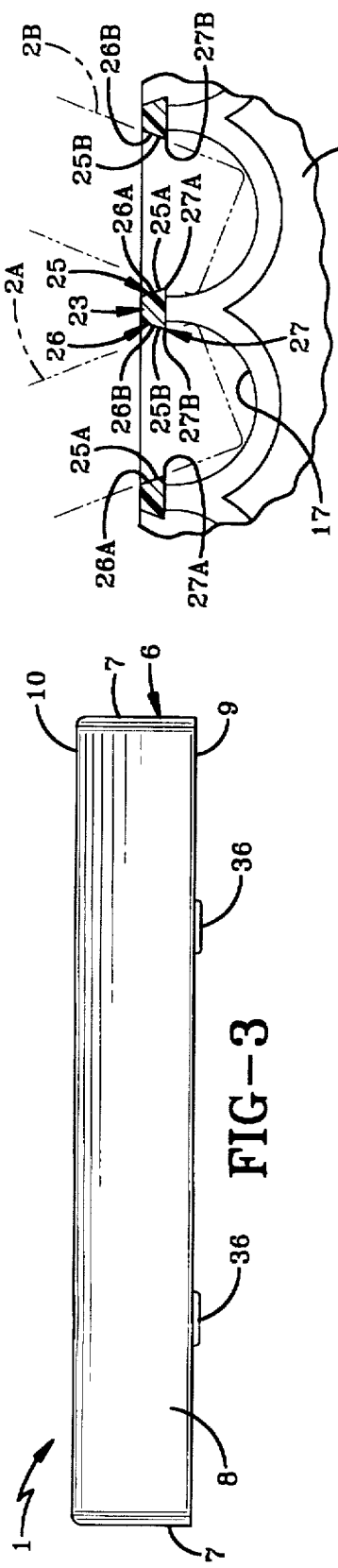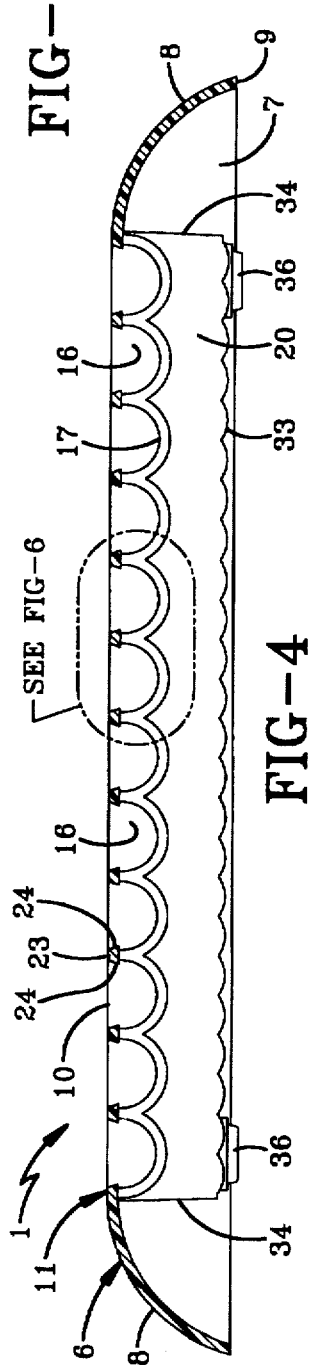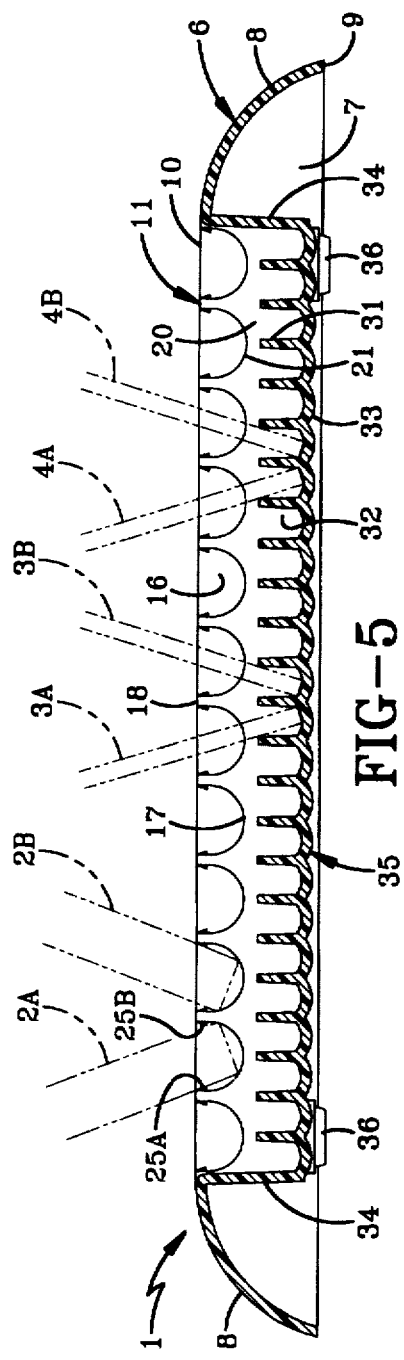

STORAGE RACK FOR RETAINING SOFTWARE DEVICES HAVING MULTIPLE CONFIGURATIONS

BACKGROUND OF THE INVENTION

1. Technical Field

The invention relates generally to storage racks. More particularly, the invention relates to storage racks for retaining prerecorded software. Specifically, the invention relates to desk top storage racks that retain software devices in a variety of configurations such that the software may be flipped between a forward position and a rearward position while retained in the storage rack.

2. Background Information

Since the advent of the personal computer, manufacturers and industrial users have continually developed faster, smaller and more versatile machines, including portable computers that are dedicated to perform a specific function such as word processing, data collection or item identification. Alternatively, portable computers may be all purpose computing machines capable of running a variety of types of software programs. These portable personal computers may include a variety of input/output devices such as disk drives, CD ROM players, or PCMCIA (personal computer memory card international association) card slots. As the cost of these computers continues to decrease, and the power associated therewith continues to increase, personal computers are becoming an integral part of today's society.

Both general purpose and dedicated computers generally include at least one electronic interface port for receiving software in a variety of configurations including diskettes, cartridges, cassettes or cards which store electronic data.

Devices that store electronic data have a variety of configurations or formats with each format having a corresponding format reader for receiving the particular software format. For example, a 3½ inch disk drive is utilized to read 3½ inch software diskettes, a CD ROM player is utilized to read CD ROM diskettes, and PCMCIA cards are received within PCMCIA card slots. Often a single computer system will include two or more of these format readers, thus permitting the system user to transfer data to and from the system utilizing any of the available software formats.

CD ROM disks are a relatively new form of recording media which are growing in popularity with increasing sales of compact disc players for audio, and CD ROM player for data input. The CD ROM discs are thin flexible plastic resin sheets with a digitally recorded engraved pattern and resemble small vinyl phonograph records. Data is removed from the disc by a laser enclosed in a compact disc player. CD ROM discs are generally utilized for storing large databases, with the associated CD ROM players permitting quick retrieval from, and searching capability of, the database included on the CD ROM disc. Generally, the user will purchase multiple databases, with each database carried on one or more discs such that the disc which includes the database to be searched, is placed in a CD ROM disc player, and accessed via the computer system.

Another type of electronic interface commonly available is the PCMCIA (personal computer memory card international association) slot. PCMCIA slots permit the user to add additional memory via the insertion of a PCMCIA memory card into the slot. As with all software formats, such additional memory may then be removed and used in a separate computer system allowing multiple systems to operate on a single data set. PCMCIA interfaces continue to grow in popularity, and a San Jose based market research firm has estimated that half of the seven million notebook computers shipped in 1993 contained PCMCIA slots, and that by 1995, 13 million notebook computers will be shipped and 97% of them will be equipped with PCMCIA slots. As such, PCMCIA slots are quickly becoming standard in both PDA (personal digital assistant), lap top and personal desk top computers, and the popularity of the PCMCIA interfaces are expected to dramatically increase in the near term.

The primary benefit of the PCMCIA interface is that as electronic technology continues to miniaturize, PCMCIA cards are utilized to housed additional input/output devices. For example, PCMCIA cards now house phone modems, laser readers, barcode scanners, and a variety of input/output devices apart from standard memory cards. Moreover, as with 3½ inch disks, and a variety of other software formats, PCMCIA card specifications are standardized as shown in PCMCIA Release No. 2.01.

Given the popularity of existing software formats, the increase in the number of available formats, and the number of format readers included in computer systems, the need exists for a storage rack which will permit the user to store software in a variety of formats at a single location, and in a single receptacle whereby the multiple formats may be stored in a single storage rack, and easily accessed by a user.

U.S. Pat. No. 4,629,067 issued to Pavlik, et al., while presumably adequate for the purpose for which it is intended, only retains software in a single format. While Pavlik does retain an edge portion of the software device of retain the software in a near vertical orientation, such that the software disks may be moved in the grooves between a forward and rearward position such that the user can "flip" through the software to locate the appropriate disk, Pavlik does not permit the storage and retrieval of software devices in multiple configurations. As such, the user is required to purchase a rack for each different type of software which is utilized. The use of multiple racks is substantially more expensive, and requires significantly more space in the user's office.

Therefore, the need exists for an improved software storage rack for storing software stored in multiple formats which will simultaneously retain multiple software formats in a single rack, such that the software may be moved between a forward and rearward position for viewing and retrieval by a user.

SUMMARY OF THE INVENTION

Objectives of the invention include providing a storage rack which retains software in a safe, accessible manner.

Another objective is to provide a storage rack which retains software stored on devices having a variety of formats such that each format is equally accessible to the user.

A further objective is to provide a storage rack which receives an edge of a variety of software devices, wherein each device retains electronic data.

A still further objective is to provide a storage rack which retains an edge of software devices such that the software devices may be moved between a forward position and a rearward position whereby the front surface of each software device may be viewed in sequential or selective order.

Yet another objective is to provide a storage rack which fits conveniently on a user's desk.

A still further objective is to provide such a storage rack in which a single rack provides overlapping receipt areas for CD ROM packages, 3½ inch software diskettes, and PCMCIA cards.

Another objective is to provide such a storage rack which is of simple construction, which achieves the stated objectives in a simple, effective and inexpensive manner, and which solves problems and satisfies needs existing in the art.

These and other objectives and advantages of the invention are obtained by the improved storage rack, the general nature of which may be stated as including a body having a pair of spaced apart sidewalls, a pair of end walls extending between said sidewalls, and a top wall; the sidewalls and end walls defining an opening; and a platform supported by the body in said opening formed with a first software support means adapted for supporting software of a first format, and a second software support means adapted for supporting software of a second format.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

FIG. 3 is an end view of the storage rack shown in FIG. 1;

FIG. 4 is a sectional view taken along line 4–4, FIG. 2;

FIG. 5 is a sectional view taken along line 5–5, FIG. 2 shown with a CD ROM package, a 3½ inch software diskette and a PCMCIA card in both forward and rearward positions in dot-dash lines; and FIG. 6 an enlarged fragmentary sectional view of the encircled portion of FIG. 5 shown with a CD ROM package in dot-dash lines in the forward and rearward position.

Similar numerals refer to similar parts throughout the drawings.

DESCRIPTION OF THE PREFERRED EMBODIMENT

Figure 1:
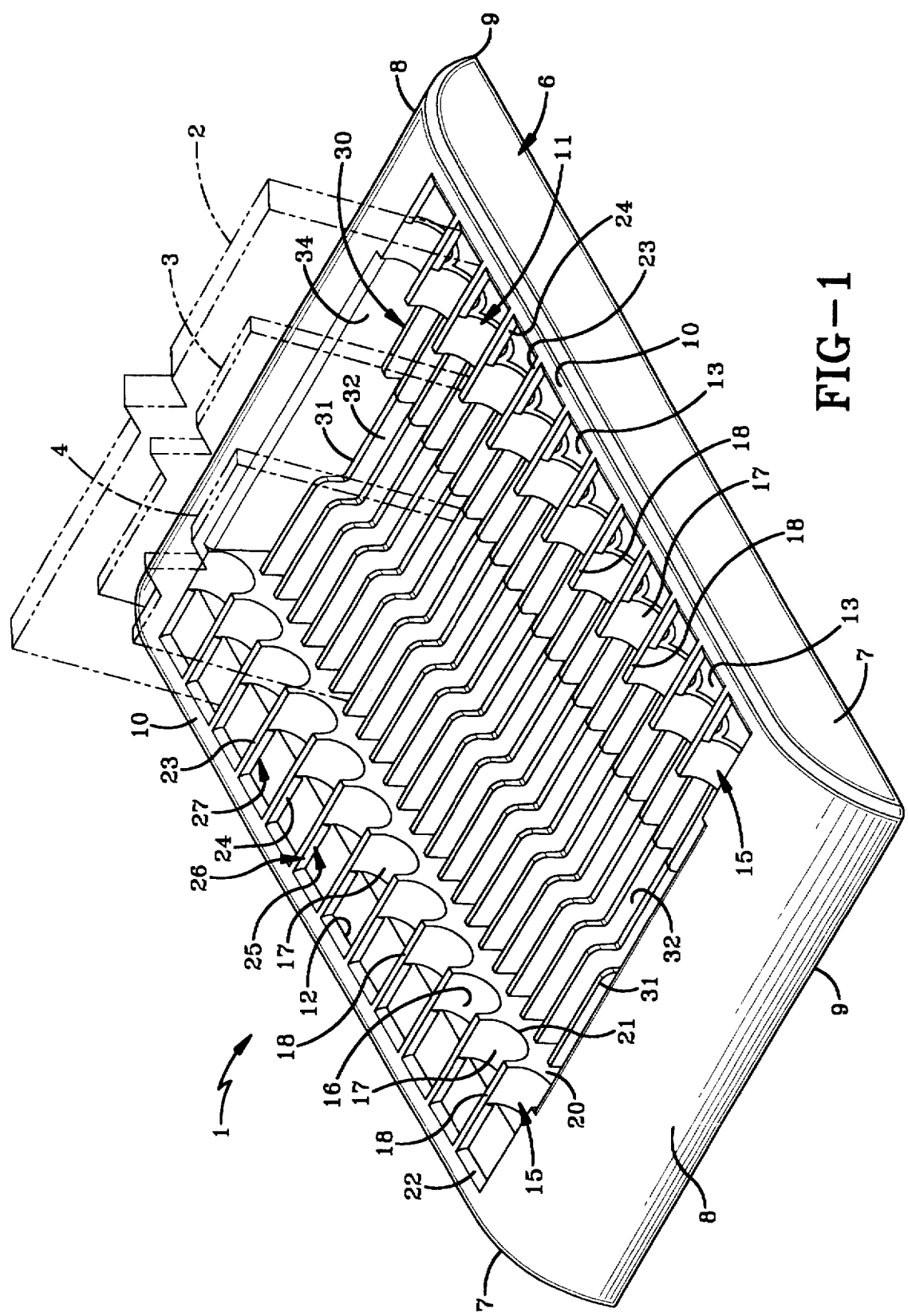
FIG. 1 is a perspective view of the storage rack of the present invention shown with a CD ROM package, a 3½ inch software diskette and a PCMCIA card in the rearward position in dot-dash lines.

The improved storage rack of the present invention is indicated generally at 1, and is shown particularly in FIG. 1 supporting a CD ROM package 2, a 3½ inch software diskette 3 and a PCMCIA card 4, hereinafter collectively referred to as software devices. Software devices 2, 3 and 4 are shown in dot-dash lines in FIG. 1 in full width and only partially in length.

Display rack 1 preferably is formed as a one-piece plastic member molded of high impact polypropylene or other suitable moldable plastic material. Package 1 includes a body indicated generally at 6, which has a generally rectangular shape. Body 6 includes a pair of parallel and spaced apart sidewalls 7 and a pair of parallel and spaced apart end walls 8 which extend between sidewalls 7 and are substantially perpendicular thereto. End walls 8 are arcuate and extend from a lower edge 9 to a top wall 10. Top wall 10 is substantially horizontal, and extends between sidewalls 7 and end walls 8, and defines the peripheral of a rectangularly shaped opening 12 containing a platform 11.

Platform 11 is formed integrally as a one-piece member with body 6, and has a side support rack 15 adjacent each sidewall 7. Each side support rack 15 is formed with a plurality of equally spaced grooves 16, each formed with an arcuate trough 17 intermediate a pair of peaks 18. Grooves 16 have a width sized to accept a standard CD ROM package therein as more fully described below. The peak 18 at each end of side support rack 15, is integrally formed with top wall 10. Each side support rack 15 is further formed with an inner wall 20 having an upper scalloped edge 21 complimentary to troughs 17 and peaks 18, and a lower scalloped edge which extends below troughs 17. Top wall 10 has an inner edge 22 which extends substantially around platform 11. A plurality of beams 23 are formed integrally with top wall 10 and extend inwardly from inner edge 22 adjacent each sidewall 7. Beams 23 join side support racks 15 at each peak 18 and provide support for platform 11 within opening 12. Beams 23 also define a plurality of openings 13 located between each pair of beams and between platform 11 and each sidewall 7, whereby beams 23 are the only connection between body 6 and platform 11 along the longitudinal length of the platform.

Referring specifically to FIGS. 4 and 5, each beam 23 includes a pair of spaced side surfaces 24, each of which includes an outwardly extending angled flange 25 having a support face 26 extending away from beam 23 and terminating at a horizontal shoulder 27. Each beam 23 thus provides a pair of opposing flanges 25A and 25B (FIG. 6) with opposing support faces 26A and 26B, and opposing shoulder 27A and 27B, the purpose of which will be described below.

In accordance with one of the main features of the present invention, platform 11 includes a central support rack 30 (FIG. 1) which is supported from and extends between inner walls 20. Central support rack 30 includes a plurality of longitudinally spaced dividers 31 integrally connected to and extending laterally between inner walls 20. Dividers 31 are substantially parallel to each other and join inner walls 20 below troughs 17 and form a transversely extending slot between each pair of the dividers and between a divider and each end wall 8. Central support rack 30 is also formed with a scalloped bottom wall 33 extending beneath dividers 31 and elongated slots 32 (FIGS. 2 and 4). A vertical inner wall 34 extends between top wall 10 adjacent each end wall 8, and bottom wall 33 to provide added support to platform 11 (FIGS. 4 and 5).

Dividers 31 are formed with recessed central portions 35 to provide easy insertion of software diskette 3 into elongated slots 32. In accordance with another of the main features of the present invention, the ends of dividers 31 join each inner wall 20 below troughs 17 of each groove 16 whereby software having a first format (CD ROM disks) may be supported in a pair of transversely spaced aligned grooves 16 and extend over central support rack 30 without interference therebetween.

Bottom wall 33 of central support rack 30 is provided with a plurality of skid resistant feet 36 which frictionally engage a desk top, and prevent display rack 1 from sliding thereon (FIGS. 3–5).

Figure 2:
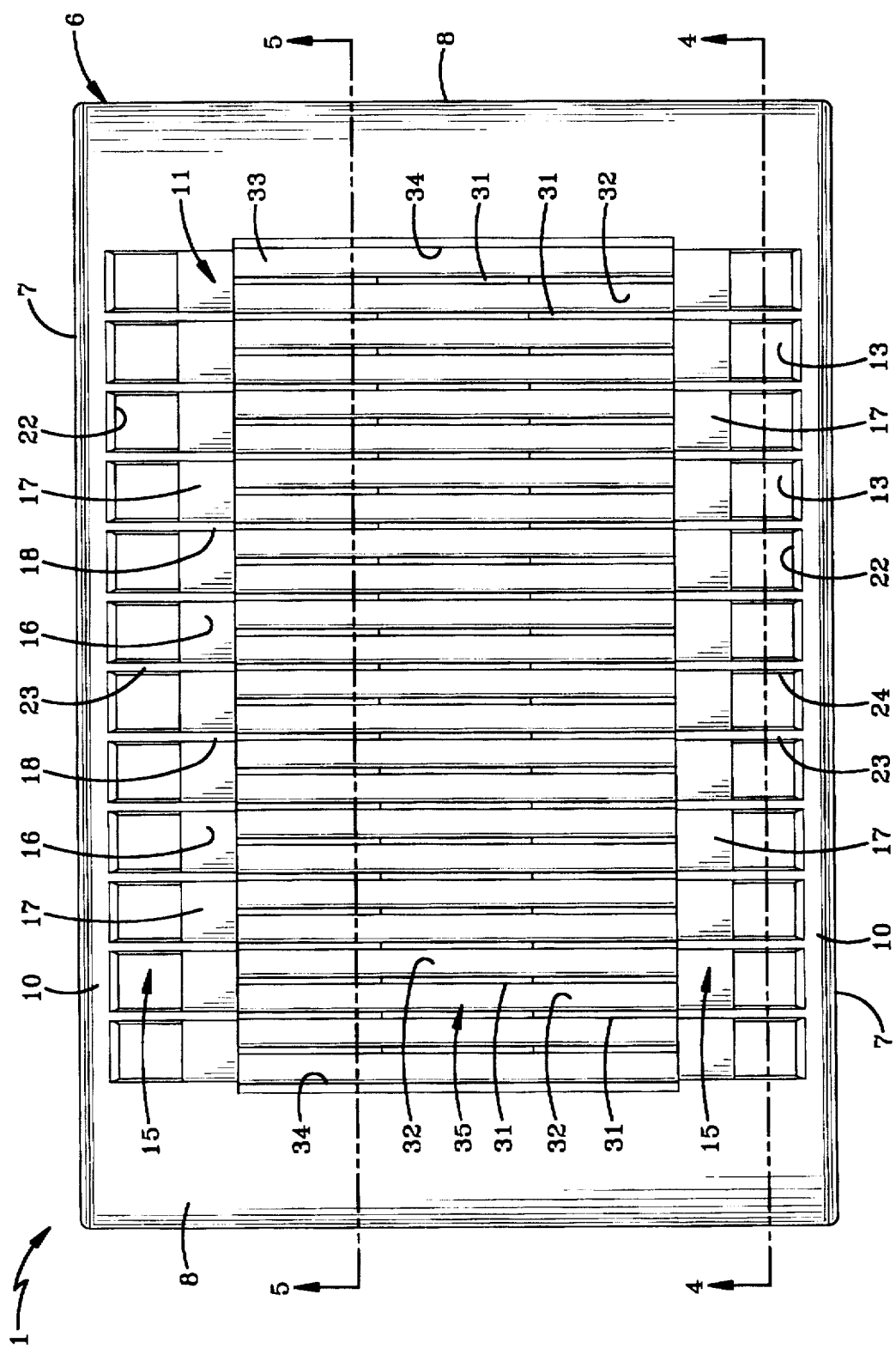
FIG. 2 is a top view of the storage rack shown in FIG. 1.

As best seen in FIGS. 1 and 5, display rack 1 supports software in a variety of formats. Specifically, grooves 16 are sized in the broad range of from approximately ⅛ inch to ¾ inch, and more specifically in the range of ⅜ inch to ½ inch for receiving an edge of CD ROM package 2. Sidewalls 7 are spaced apart a transverse distance in the range of from 5 inches to 6 inches, and more particularly are approximately 5½ inches apart whereby sidewalls 7 prevent lateral movement of CD ROM package 2 when supported in a groove 16. Grooves 16 are larger than CD ROM package 2 to permit pivotal movement between a forward position shown at 2A, and a rearward position shown at 2B (FIGS. 5 and 6).

Support face 26 of each flange 25 is substantially parallel to CD ROM package 2, and is in planar contact therewith when package 2 is leaning thereagainst. Specifically, when CD ROM package 2 is lying adjacent flange 25A (FIGS. 5 and 6), support face 26A is coplanar with the forward surface of CD ROM package 2 and shoulder 27B contacts the rearward surface of CD ROM package 2 to limit the angle to which package 2 will rotate. Similarly, when CD ROM package 2 is in the position of package 2B (FIGS. 5 and 6), support face 26B of flange 25B is in planar contact with the rear surface of package 2B, and shoulder 27A of flange 25A contacts the front surface of package 2B to prevent further rearward rotation thereof. As is apparent from FIGS. 1 and 5, CD ROM packages 2 may be selectively moved between a forward and rearward position such that as each package 2 is moved to the position shown by package 2A, the user may view the front surface of each successive package 2.

Central support rack 30 retains software in a second format (3½ software diskettes), and is sized in the transverse or lateral dimension of from 3 inches to 4½ inches and more specifically, dividers 31 and elongated slots 32 are in the range of from 3½ inches to 4 inches for receiving 3½ inch software diskettes 3.

Software diskettes 3 are supported by bottom walls 33 of elongated slots 32 and may also be moved between a forward position, the position of software diskette 3A in FIG. 5, and a rearward position, the position of software diskette 3B in FIG. 5. When software diskette 3 is positioned in an elongated slot 32, the diskette 3 will contact the top of divider 31 preventing it from further rotation in the forward or rearward direction.

PCMCIA cards 4 may also be retained within central support rack 30 just as software diskettes 3 are retained. PCMCIA card 4A is shown in FIG. 5 in the forward position, and PCMCIA card 4B is shown in the rearward position substantially identical to the positions of 3½ inch software diskettes 3A and 3B. Both software diskettes 3 and PCMCIA cards 4 may thus be moved between forward and rearward positions to permit the user to view successive software devices 3 and 4 either selectively or sequentially.

In summary, display rack 1 provides a single or one-piece integrally molded unit for retaining software devices in multiple formats, and specifically provides a pair of laterally spaced side support racks 15 for retaining CD ROM packages, and central support rack 30 for retaining 3½ software diskettes, and PCMCIA cards. Central support rack 30 is positioned entirely below troughs 17 of grooves 16 of side support racks 15, and CD ROM packages 2 are suspended over and out of contact with central support rack 30 when retained within grooves 16 of side support racks 15. CD ROM packages 2, 3½ software diskettes 3 and PCMCIA cards 4 are selectively retained in either a rearward or forward position, and are movable therebetween for selectively or sequentially viewing the front cover of each software device. The software devices may be selectively moved between the respective positions even though CD ROM packages 2 are retained in side support racks 15 and 3½ inch software diskettes 3 and PCMCIA cards 4 are retained in central support rack 30 below side support racks 15. Thus, software devices in multiple formats may be retained in a single storage rack and conveniently positioned on a user's desk top.

Accordingly, the improved display rack is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved display rack is constructed and used, the characteristics of the construction, and the advantageous, new and useful results obtained; the new and useful structures, devices, elements, arrangements, parts and combinations, are set forth in the appended claims.

I claim:

1. A storage rack for receiving software in a plurality of software formats, said storage rack comprising:
    a body having a pair of spaced apart sidewalls, a pair of end walls extending between said sidewalls, and a top wall;
    the sidewalls and end walls defining an opening; and
    a platform integrally formed with the body and positioned in said opening formed with a first software support means adapted for supporting software of a first format, and a second software support means adapted for supporting software of a second format, and in which the first software support means and the second software support means are positioned adjacent one another on said platform and within the opening, said first software support means including a side support rack adjacent each sidewall and said second software support means including a central support rack intermediate the side support racks of the first software support means, each of said side support racks including a plurality of laterally extending grooves, each groove being formed with a peak and a trough whereby the side support racks are adapted to accept an edge of the first software format, with the central support rack being positioned below the troughs of the side support racks.

2. A storage rack as defined in claim 1, in which each side support rack is formed with an inner wall; and in which the central support rack is attached to and extends between said inner walls whereby said inner walls at least partially supports the central support rack, and is adapted to prevent lateral movement of the second software format in the central rack.

3. A storage rack as defined in claim 1 in which the peak of each laterally extending groove is coplanar with the top wall; and in which the trough of each laterally extending groove lies below the top wall.

4. A storage rack as defined in claim 1 in which each of the troughs of the side support rack grooves is positioned between a pair of peaks; in which each of the peaks is formed with an inwardly extending flange having a support face; and in which the first software format is adapted to be held at either a forward angle against one of the support faces, or a rearward angle against another of the support faces and freely rotated therebetween.

5. A storage rack as defined in claim 1 in which the body and platform are formed as a one-piece member of plastic material.

6. A storage rack as defined in claim 5 in which the central support rack includes a plurality of laterally extending dividers; in which adjacent dividers define elongated slots therebetween; in which a bottom wall extends under the plurality of dividers and the elongated slots; and in which the bottom wall is adapted to support a second software format when positioned in the elongated slots.

7. A storage rack as defined in claim 6 in which each side support rack is formed with an inner wall; and in which the central support rack is attached to said inner walls whereby said inner walls at least partially support the central support rack and are adapted to prevent lateral movement of the second software format in the central support rack.

8. A storage rack as defined in claim 6 in which each side support rack is formed with an inner wall; in which each divider has a top edge positioned below the troughs of the side support racks; and in which each divider extends between said inner walls.

9. A storage rack as defined in claim 8 in which the top wall includes an inner edge; and in which the inner edge is adapted to prevent lateral movement of the first software format supported in one of the grooves.

10. A storage rack as defined in claim 9 in which the top wall is formed with a plurality of beams extending substantially perpendicular to the sidewalls; and in which each beam extends between the top wall and a respective side support rack adjacent a respective groove.

11. A storage rack as defined in claim 10 in which successive beams define a through aperture therebetween, whereby the beams are the only members extending between the top wall and the adjacent side support rack.

12. A storage rack as defined in claim 9 in which the grooves of the side support racks are transversely aligned whereby a first software data format is supported in the grooves and extends over the central rack; and in which a second software data format is adapted to be supported in the elongated slots of the central support rack and extends between the inner walls of the side support racks.

13. A storage rack as defined in claim 12 in which the sidewalls of the side support racks are spaced transversely apart a distance in the range of from 5 inches to 6 inches whereby the side support racks will retain a compact disc package; and in which the dividers of the central support rack have a length in the range of from 3 to 4 inches whereby the central support rack is adapted to receive 3½ inch software diskettes and Personal Computer Memory Card International Association cards.

* * * * *